US012203291B2

(12) United States Patent
Schmitz et al.

(10) Patent No.: US 12,203,291 B2
(45) Date of Patent: Jan. 21, 2025

(54) MODULAR CLOSURE SYSTEM

(71) Applicant: EMKA BESCHLAGTEILE GMBH & CO. KG, Velbert (DE)

(72) Inventors: Markus Schmitz, Velbert (DE); Thomas Dettmar, Velbert (DE)

(73) Assignee: EMKA BESCHLAGTEILE GMBH & CO. KG, Velbert (DE)

( * ) Notice: Subject to any disclaimer, the term of this patent is extended or adjusted under 35 U.S.C. 154(b) by 131 days.

(21) Appl. No.: 17/778,436

(22) PCT Filed: Dec. 1, 2020

(86) PCT No.: PCT/DE2020/101012
§ 371 (c)(1),
(2) Date: May 20, 2022

(87) PCT Pub. No.: WO2021/110211
PCT Pub. Date: Jun. 10, 2021

(65) Prior Publication Data
US 2022/0412125 A1 Dec. 29, 2022

(30) Foreign Application Priority Data
Dec. 6, 2019 (DE) ..................... 10 2019 133 323.7

(51) Int. Cl.
*E05B 63/00* (2006.01)
*E05B 13/00* (2006.01)

(52) U.S. Cl.
CPC ........ *E05B 63/0056* (2013.01); *E05B 13/002* (2013.01)

(58) Field of Classification Search
CPC .... E05B 63/00; E05B 63/0056; E05B 63/006; E05B 3/00; E05B 13/00; E05B 13/002; E05B 13/10; E05B 47/00; E05B 47/0657; E05B 47/0661; E05B 47/0665; E05B 47/0669; E05B 47/0673
USPC ........................................................ 292/336.3
See application file for complete search history.

(56) References Cited

U.S. PATENT DOCUMENTS 5,347,834 A 9/1994 Ramsauer
5,893,282 A 4/1999 Runge et al.
2003/0141724 A1 * 7/2003 Ramsauer ........... E05B 47/0657 292/348

(Continued)

FOREIGN PATENT DOCUMENTS

CA 3098527 A1 * 11/2019 ........... E05B 15/006
DE 9004756 U1 8/1991

(Continued)

OTHER PUBLICATIONS

CA-3098527-A1; Johansson (Year: 2019).*

(Continued)

*Primary Examiner* — Nathan Cumar
(74) *Attorney, Agent, or Firm* — Thompson Hine LLP

(57) ABSTRACT

A door having a modular locking system that in embodiments includes a dish which can be arranged on a first side of the door; an actuating lever that can be pivoted in relation to the dish for actuating the locking device that is on the other side of the door; a securing device for arresting the actuating lever on the dish; and a release module that disengages the arresting action; wherein the release module is an extension of the dish.

15 Claims, 8 Drawing Sheets

(56) References Cited

U.S. PATENT DOCUMENTS

| | | | | |
|---|---|---|---|---|
| 2007/0028656 A1* | 2/2007 | Jospe | E05C 1/14 70/210 |
| 2007/0240463 A1* | 10/2007 | Antonucci | E05B 13/002 70/208 |
| 2010/0107803 A1* | 5/2010 | Ramsauer | E05B 5/003 74/510 |
| 2014/0373580 A1* | 12/2014 | Le | E05B 5/00 292/307 R |
| 2017/0058583 A1* | 3/2017 | Kim | E05B 13/002 |
| 2017/0260782 A1* | 9/2017 | Kim | E05B 13/002 |

FOREIGN PATENT DOCUMENTS

| | | |
|---|---|---|
| DE | 20 2007 004 434 U1 | 8/2008 |
| DE | 10 2017 108 446 A1 | 10/2018 |
| DE | 20211508 U1 | 10/2020 |
| WO | 95/29314 A1 | 11/1995 |
| WO | 2018/192676 A1 | 10/2018 |

OTHER PUBLICATIONS

European Patent Office (ISA/EP), International Search Report (with English translation), International Application No. PCT/DE2020/101012, 5 pages, Mar. 11, 2021.

International Preliminary Report on Patentability pertaining to PCT Application No. PCT/DE2020/101012, 9 pages, Jun. 16, 2022.

* cited by examiner

MODULAR CLOSURE SYSTEM

TECHNICAL FIELD

The disclosure relates to a modular locking system for a door, having a dish, which can be arranged on a first side of the door, having an actuating lever, which can be pivoted in relation to the dish and is intended for actuating a locking device, which can be arranged on the other side of the door and is intended for locking the door, having a securing device for arresting the actuating lever on the dish, and having a release module for disengaging the arresting action.

BACKGROUND

Such locking systems are used in a wide variety of areas and serve essentially to lock or to unlock a door, a window, a shutter or also other closing elements. Reference will be made hereinbelow to a door, as being representative of these different closing elements.

The outside of the door, in such locking systems, usually contains a dish, which can at least partially close or cover over at least one of the openings arranged in the door. An actuating lever is usually arranged on the dish, this actuating lever being coupled to a locking device, arranged on the inner side of the door, such that movement of the actuating lever can move the locking device back and forth between a locking position and an unlocking position. In the unlocking position, the door is movable and can be opened or closed. If the door is locked in the closed position, it is no longer movable and can be opened again only when the locking device is transferred back into the unlocking position.

In order to prevent undesired unlocking of the door, a securing device, which can be used to arrest the actuating lever on the dish, is usually provided. If the actuating lever has been arrested, it cannot be moved, and therefore nor can the locking device be pivoted into the unlocking position in order for the door to be unlocked.

To this extent, in order to unlock, and then to open, the locking device or the door, it is necessary first of all to disengage the arresting action of the actuating lever. A release means is provided for disengagement purposes, the release means interacting with the securing device and making it possible to disengage the arresting action of the actuating lever. As soon as the arresting action has been disengaged, the actuating lever can thus be moved, and so too can the locking device be moved back and forth again between the unlocking position and the locking position.

In the case of locking systems known from the prior art, it has also proven successful if, rather than being fixed to the rest of the constituent parts, the release means is designed in the form of a release module and can be changed over in a variable manner. A locking system having such a release module is disclosed, for example, in DE 10 2017 108 446 A1. The release module of this locking system is connected to the dish in a disengageable manner and can be pulled out of the dish in the downward direction or pushed into the dish from below.

DE 20 2007 004 434 U1 likewise discloses a modular locking system in which a release module is provided, it being possible for this release module to be inserted into the dish from the front.

In the case of both locking systems described in the prior art, the dish forms a kind of frame or holder for the release module, and therefore, although they can be changed over fairly straightforwardly, the release modules have to be adapted to the dish or to the module holder of the dish, in which case the design of the release modules is subject to limits.

Taking this as the departure point, it is the object of the invention to specify a modular locking system with improved variability.

SUMMARY

This object is achieved in the case of a modular locking system of the type mentioned in the introduction in that the release module is designed in the form of an extension of the dish.

Designing of the release module in the form of an extension of the dish makes it possible for the release module to be designed in a variable manner independently of the dish. This is because it is no longer necessary for the release module to be inserted into the dish, and therefore neither is it necessary any longer for it to be adapted to the dish, in particular as far as its geometrical dimensions are concerned. Furthermore, the fact that the release module is independent of the dish also opens up the possibility of a plurality of release modules being used at the same time.

As far as the design of the release module is concerned, it has been found to be advantageous if the release module has a lock cylinder which, in a release position, disengages the arresting action of the actuating lever. The lock cylinder can be transferred into the release position, by rotation about an unlocking axis, for example by means of an appropriate key or an appropriate tool. If use is made of an incorrect key or an incorrect tool, the lock cylinder cannot move, and therefore neither is it possible for it to disengage the arresting action of the actuating lever. The lock cylinder need not necessarily be cylindrical; rather, it can be a locking means in the quite general sense. Use will be made hereinbelow of the term block cylinder, as being representative of a locking means.

In respect of the variability of the device, it has been found to be advantageous if a plurality of release modules are provided and can be optionally inserted as an extension of the dish. Depending on requirements, the release modules which are to be used can be selected from a multiplicity of different release modules, and the different release modules can differ in terms of their lock cylinder. To this extent, it is possible, for example, for the different release modules to require different keys or different tools to rotate the lock cylinders. For the purpose of disengaging the arresting action of the actuating lever, it is possible, to this extent, to provide a certain tool/lock-cylinder combination or key/lock-cylinder combination. Furthermore, it is also possible for the release modules to differ in terms of their size and geometrical dimensions.

It is also advantageous if a plurality of the release modules can be used together, wherein the arresting action of the actuating lever can be disengaged by any individual one of the release modules. It is therefore not always necessary to select just one release module from the different release modules; rather, it is also possible to select a plurality of release modules and then use these together. In the case of this design, the arresting action can be disengaged just by a single release module being released. The plurality of release modules can extend the dish together and be positioned adjacent to one another.

It is also possible for the release modules to be designed in the form of endpieces or intermediate pieces. The intermediate pieces can be provided between the dish and an endpiece or a further intermediate piece. If just one release module is provided, this can be designed in the form of an endpiece. If use is made of yet further release modules in addition, these can be designed in the form of intermediate pieces and introduced between the dish and the endpiece. The contour of the end region of the endpiece can be different to that of the intermediate piece, for example the endpiece can be rounded at the lower end. Although the endpieces and the intermediate pieces advantageously do not differ in terms of their functionality, they can be provided with different lock cylinders.

It is further advantageous if use is made of a plurality of release modules with different lock cylinders. This makes it possible for the arresting action to be disengaged by means of different keys and/or different tools. It is often desirable, for example, for different people to be able to unlock the door, even though these people do not have, or should not have, the same key. The use of a plurality of release modules with different lock cylinders therefore means that each person can have an individual key which can release just one of the release modules. To this extent, the door can then be unlocked by means of different keys. The use of two different release modules has proven successful in practice.

In respect of the position of the release module, it has been found to be advantageous if this module is arranged below the dish. The release module can be at one end, in particular an upper end, adjacent to the dish, and can thus extend the dish in the downward direction. The release module can be inserted into an opening in the door below the dish from the front, that is to say from the direction of the first side of the door. The release module can have the same width as the dish, and it therefore appears as if the release module itself is part of the dish. It also the case that an opening in the door of a constant width can also be reliably covered as a result of this design. If a plurality of release modules are used at the same time, these can be arranged in a row one below the other. In an alternative design, however, it is also possible for the release module to extend the dish in the upward direction and, accordingly, to be arranged above the dish.

The release module can furthermore also have a guide element, which is designed in particular in the form of a guide pin and via which the release module can be guided in the dish. If the release module extends the dish in the downward direction, the guide element can be arranged in the upper end region of the release module. It has been found to be particularly advantageous to have two guide elements which are designed in the form of guide pins and run parallel to one another. The dish can have a holder for the guide elements, it being possible for the guide elements to engage in said holder. The release module can be retained on the dish via the guide elements.

It has also been found to be advantageous if the release module has a bearing region for bearing on the door. The bearing region allows the release module to bear with surface-area contact on the first side of the door and to cover an opening in the door. The release module can thus be mounted directly on the door, and it is not imperative for the dish to be connected directly to the release module. The bearing region can have three bearing surfaces, in particular two lateral ones and an upper or lower bearing surface, and it is therefore possible for three sides of the release module to bear on the door. The bearing region can be designed in dependence on the position of the release module. If the release module is designed, for example, in the form of an intermediate piece, then the bearing region can comprise just two lateral bearing surfaces. If the release module is designed in the form of an endpiece, the bearing region can additionally comprise an upper or a lower bearing surface, depending on whether the release modules extend the dish in the upward or downward direction. The bearing region can be designed in the manner of a collar.

In respect of the dish, it has been found to be advantageous if this dish has a holding contour for holding the actuating lever. In the arrested position, the actuating lever can be located in the holding contour and therefore be connected to the dish in a form-fitting manner. A rotary movement of the actuating lever is then not possible on account of this form fit. For actuating purposes or for unlocking the door, the actuating lever first of all has to be pivoted out of the holding contour of the dish. For this purpose, the actuating lever can be pivoted out of the excess about a pivot axis running, in particular, parallel to the door. From a certain angle, it is then possible for the actuating lever to be pivoted in relation to the dish about an actuating axis, wherein the actuating axis can be arranged perpendicular to the door and perpendicularly to the pivot axis. This movement of the actuating lever about the actuating axis then allows the door or the locking device to be locked or unlocked. In the pivoted-in position, the actuating lever can be held in a flush state in the holding contour, in which case it does not project in relation to the dish. The actuating lever can be prestressed into the pivoted-out position via a spring element, and therefore, when the arresting action is disengaged, the actuating lever is automatically pivoted out of the holding contour.

In this context, it has also been found to be advantageous if the release module has also a holding contour, which is in alignment with the holding contour of the dish. This makes it possible for the actuating lever, in the pivoted-in position, to be held in both holding contours in a form-fitting manner. The holding contour of the dish can thus be extended by the holding contour of the release module. In terms of its width and depth, the holding contour of the release module can be designed in exactly the same way as the holding contour of the dish. If a plurality of release modules are used, all the release modules can have a holding contour, these holding contours being in alignment with one another.

In respect of the actuating lever, it has also been found to be advantageous if the actuating lever has an actuating portion and a lock-cylinder cover, which is connected to the actuating portion in an articulated manner. In the pivoted-in position of the actuating lever, the lock-cylinder cover can cover the release module or release modules, in which case the lock cylinders are not visible. The lock cylinders can thus be protected, for example, against dirt or other external influences. The lock-cylinder cover can be arranged in the holding contour of the release module or of the release modules. However, the release module can be moved in relation to the actuating portion even when the actuating lever has been arrested. Therefore, for the purpose of unlocking the door, it is possible first of all for the lock-cylinder cover to be pivoted in relation to the actuating portion and for the lock cylinder thus to be exposed. In a next step, a key or tool can then be used to rotate the lock cylinder about the unlocking axis and thus to move the same into the release position, as a result of which the arresting action of the actuating lever is then disengaged and the actuating lever can be pivoted out of the holding contour. The axis about which the lock-cylinder cover can be pivoted in relation to the actuating portion can run parallel to the door and perpendicularly to the unlocking axis.

In order for the lock-cylinder cover to be retained reliably on the release module, it has been found to be advantageous if the release module has a retaining element. The retaining element can preferably be arranged in the region of the holding contour and be designed in the form of a magnet, which firmly holds the magnetizable lock-cylinder cover. The corresponding retaining force can prevent the situation where the lock-cylinder cover can be accidentally pivoted and the lock cylinder exposed. If the lock cylinder is to be rotated, first of all the lock-cylinder cover has to be swung up, for which purpose it is necessary to overcome the force of the retaining element.

It has also been found to be advantageous if the lock-cylinder cover has a handling portion which projects in relation to the release module, in particular in a direction parallel to the door. Even when the lock-cylinder cover is held in the holding contour, it can be swung up by hand via the handling portion.

In respect of the locking and unlocking of the door, it has been found to be advantageous if the actuating lever is connected to the locking device via an actuating spindle. The actuating spindle can extend through the door and be coupled for rotation to the actuating lever. The locking device can comprise a lock case with locking rods, which are arranged on the lock case and, when the actuating lever moves, can be moved into a locking position or an unlocking position. In the locking position, the locking rods can engage in a fixed frame of the door, or can engage behind this frame, in which case the door is secured in relation to the frame and cannot be opened. As an alternative, or in addition, the locking device can have a casement lock, which can be coupled for rotation to the actuating lever. It is also the case that, in the locking position, the casement lock can engage in the frame, or engage behind the same, for the purpose of securing the door.

It has further been found to be advantageous if a cover for covering the release module is provided, wherein the cover is connected to the dish or to the securing device, in particular in a disengageable manner. The cover can be connected to the dish or to the securing device from the second side of the door, and can therefore cover the release module from the second side of the door. The cover can therefore protect the release module and also the securing device, for example, against dirt. The cover can be designed in the manner of a cuboid with an open side and can have the open side fitted over the release module from the rear. The cover can be placed on the door or on the second side of the door. The cover can be connected to the dish and/or to the securing device via screws. It is also possible for the cover to be connected both to the dish and to the securing device. It is not necessary for the release module to be connected directly to the dish and/or to the securing device; rather, it can be connected to the dish and/or to the securing device via the cover. As an alternative, or in addition, the cover can also be connected to the door, in particular to the second side of the door.

In respect of the arrangement of the cover, it has further been found to be advantageous if the cover is connected to the release module in a disengageable manner. This connection makes it possible for the release module to be secured in relation to the dish and/or in relation to the securing device, and to be connected to the dish and/or to the securing device via the cover. For connection to the cover, the release module can have one or more fastening holders, via which the release module can be connected to the cover by way of fastening means. It has proven successful in practice if the cover is connected to the release module via screws, in particular two screws. The fastening holders of the release module can be designed in the form of threaded bores for holding the threads of the screws.

In a development of the design of the invention, it has been found to be advantageous if the release module is guided in the covering. The installation and the changeover of the release module are made easier by an appropriate guide. On account of the guide, the module cannot tilt in the cover and it is retained securely on the cover even before the subsequent connection via the fastening means. At the installation stage, it is therefore possible first of all for the cover to be connected to the dish and/or to the securing device. The release module can then be pushed into the cover from the first side of the door. The guide of the cover can be designed in the manner of a rail and can comprise, for example, two crosspieces. In respect of the guide, it has also been found to be advantageous if it has four guiding crosspieces, wherein in each case two guiding crosspieces can be arranged on opposite sides of the cover. Four guiding crosspieces allow the release modules to be introduced in a particularly convenient manner which is not much prone to error.

In respect of the design of the securing device, it has been found to be advantageous if the securing device has a securing catch, which, for the purpose of arresting the actuating lever on the dish, is in engagement with the actuating lever. The actuating lever can be arrested reliably on the dish via the securing catch, and therefore the door cannot be unlocked before the arresting action is disengaged. The actuating lever can have a hook portion and, in the arrested position, the securing catch or a hook end of the securing catch can be connected to the hook portion in a form-fitting manner and can therefore ensure a reliable arresting action. The hook end of the securing catch can be designed in a manner corresponding to the hook portion of the actuating lever. The hook portion of the actuating lever can be arranged on that side of the actuating portion which is directed toward the first side of the door. The securing device can be arranged on the second side of the door, and therefore the hook portion can extend at least partially through the door and into the securing device. It is also possible for the securing device to be a constituent part of the dish. This provides for uncomplicated installation.

In respect of a reliable arresting action, it has been found to be advantageous if the securing catch is prestressed into the arresting position via a spring element. This prestressing provides for a reliable arresting action of the actuating lever. The spring element can be designed in the form of a compression spring and be arranged on that side of the securing catch which is located opposite the release module. The securing catch can have a run-on slope, which results in the securing catch moving counter to the spring force when the actuating lever is pivoted into the dish. If the actuating lever has been pivoted all the way into the dish, it is possible for the securing catch, on account of the prestressing of the spring, to snap in behind the hook portion of the actuating lever and thus arrest the actuating lever. On account of the spring element, there is no need for the securing catch to be actively transferred into the arresting position when the actuating lever has been pivoted into the holding contour.

It has further been found to be advantageous if the securing catch can be moved linearly. A linear movement means that the securing catch or the securing device requires only a small amount of installation space. The displacement travel of the securing catch can correspond to the height of the hook portion of the actuating lever since, for the purpose of freeing the hook portion, the securing catch has to be raised by the height of the hook portion. Furthermore, in order to ensure reliable movement of the securing catch, the securing catch can be guided in a guide, in particular a linear guide. The guide ensures that the securing catch functions reliably, and therefore the securing catch cannot tilt. It is advantageous if, during the release action, the securing catch is moved in the guide counter to the force of the spring element. It is then possible for the securing catch to be moved linearly and lifted off from the hook portion, in which case the actuating lever and the securing catch disengage and the actuating lever can be pivoted out of the dish. In the region of the hook end, the securing catch can have a run-on slope, which is designed such that, when the actuating lever is pivoted into the dish, the hook portion of the actuating lever moves the securing catch counter to the spring force, and therefore the hook portion and the hook end automatically come into engagement with one another.

In an alternative design, the securing catch can also be rotatable. Although this design requires a greater amount of installation space, the risk of the securing catch tilting is nevertheless lower. Accordingly, it is also the case that this design does not require any additional guide; rather, the securing catch can be mounted at a point of rotation of the securing device. In this design, it is possible for the spring element to be arranged on that side of the point of rotation which is located opposite the hook end of the securing catch, and to push the hook end, in particular, upward. During the release action, the securing catch can then be rotated about a point of rotation, counter to the force of the spring element, until the hook end frees the hook portion.

In respect of the design of the release module, it has been found to be advantageous if this release module has a release finger, which can be transferred into a release position when the lock cylinder is rotated. By means of the release finger, the securing catch can be moved counter to the spring force of the spring element and the corresponding hook end can be disengaged from the hook portion. To this extent, the release finger can ensure that the securing catch is raised or is rotated about the axis of rotation and the hook end is lifted off from the hook portion. If the securing catch is rotatable, the release finger can raise that part of the securing catch which is located opposite the hook end, and therefore the hook end is pivoted out downward and the actuating lever is freed.

It is possible, furthermore, for the release finger to be coupled for rotation to the lock cylinder and to extend in the radial direction in relation to the lock axis. The release module can have a spring element, which prestresses the release finger and/or the lock cylinder into the securing position. The spring element can be designed in the form of an axial spring. When the lock cylinder is rotated from the securing position into the release position, the spring is subjected to stressing, and therefore the lock cylinder can return independently into the release position.

In respect of the object mentioned in the introduction, the invention further proposes a method for installing a modular locking system for a door. The locking system comprises a dish, which can be arranged on a first side of the door, also comprises an actuating lever, which can be pivoted in relation to the dish and is intended for actuating a locking device, which can be arranged on the other side of the door and is intended for locking the door, further comprises a securing device for arresting the actuating lever on the dish and additionally comprises a release module for disengaging the arresting action, wherein the release module is positioned on the dish as an extension of the same.

The modular locking system can be designed in the manner described above and results in the advantages described above.

At the installation stage, first of all the dish with the actuating lever arranged thereon can be installed in an opening in the door. In a next step, the cover can then be connected to the dish and/or the securing device from the second side of the door. Thereafter, the release module can be positioned on the dish, in an opening in the door below or alternatively above the dish, as an extension of the dish. The release module then extends through the door and is concealed by the cover, or held in the cover, on the second side of the door. Finally, the release module is then connected to the cover via the fastening means.

In respect of the removal, it has been found to be advantageous if the actuating lever first of all has to be pivoted out of the dish, before the release module can be removed. This prevents unauthorized removal of the release module. For the purpose of removing the locking system or the release module, first of all the fastening means which connect the release module to the cover have to be disengaged. Even when the fastening means have been disengaged, however, it is not possible to remove the release module. This is because the actuating portion of the actuating lever covers over the release module in the pivoted-in position. Accordingly, the release module can be pulled out only when the arresting action of the actuating lever has been disengaged and the actuating lever has been pivoted out of the dish. To this extent, for the purpose of removing the release module, it is also necessary for an appropriate key or an appropriate tool, for rotating the lock cylinder, to be present; it is not sufficient to disengage the fastening means via which the release module is connected to the cover.

In an alternative design, however, the release module can also be removed once the connection between the release module and the cover has been disengaged. The actuating portion then does not prevent the release module from being pulled out of the cover; rather, all that is required is for the lock-cylinder cover to be swung up.

In respect of the object mentioned in the introduction, the invention also proposes a door having a modular locking system, wherein the locking system is designed in the manner described above. This results in the advantages already described in respect of the locking system.

In respect of the door, it has been found to be advantageous if this has two openings. One opening can serve for connecting the actuating lever to the locking device, and the actuating spindle can extend through this opening. This release module can extend through the second opening. As an alternative, the door can also have just one opening.

When the release module has been positioned on the dish, one side of this release module can butt against the dish or against the securing device and the other three other sides thereof can butt against the door. It is possible for the collar-like bearing region here to bear on the door in the region of the edge of the opening in the door and for the rest of the release module to extend through the opening in the door.

BRIEF DESCRIPTION OF THE DRAWINGS

Further advantages and developments of the disclosed modular locking system are to be explained in yet more detail hereinbelow with reference to the accompanying drawings, in which.

DETAILED DESCRIPTION

Figure 1A:
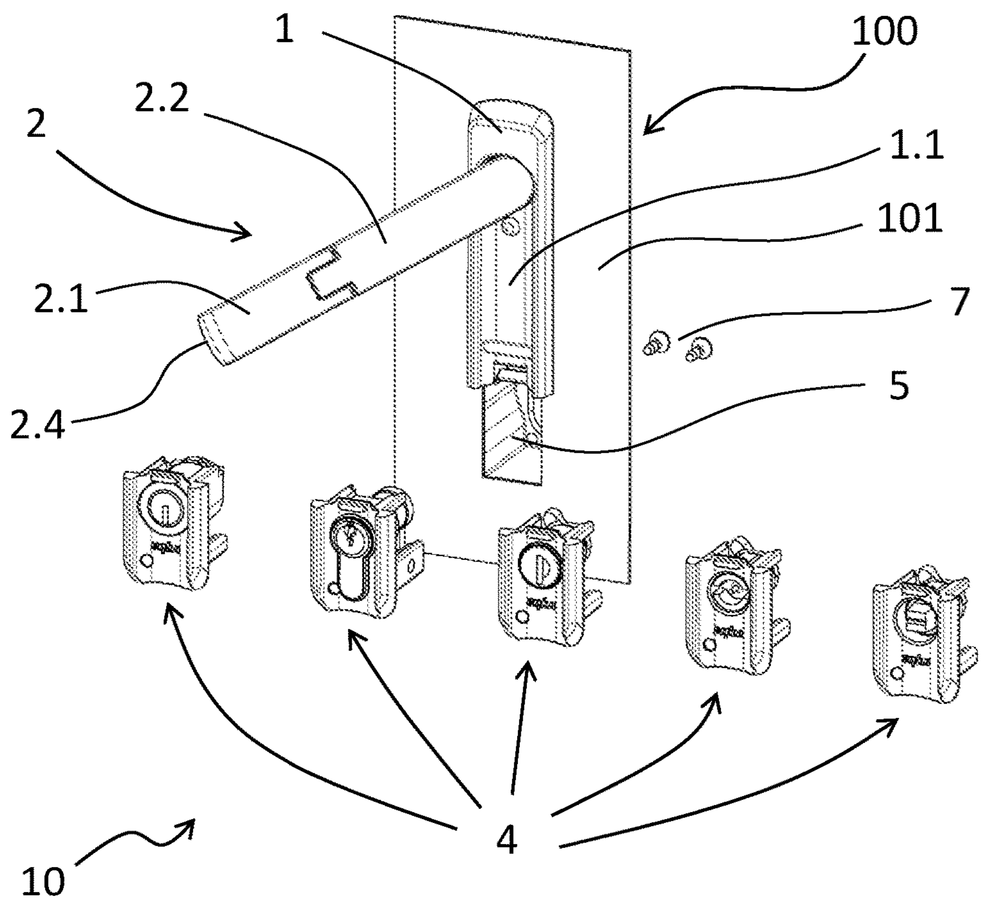
FIGS. 1*a* and 1*b* show perspective views of a modular locking system.
Figure 1B:
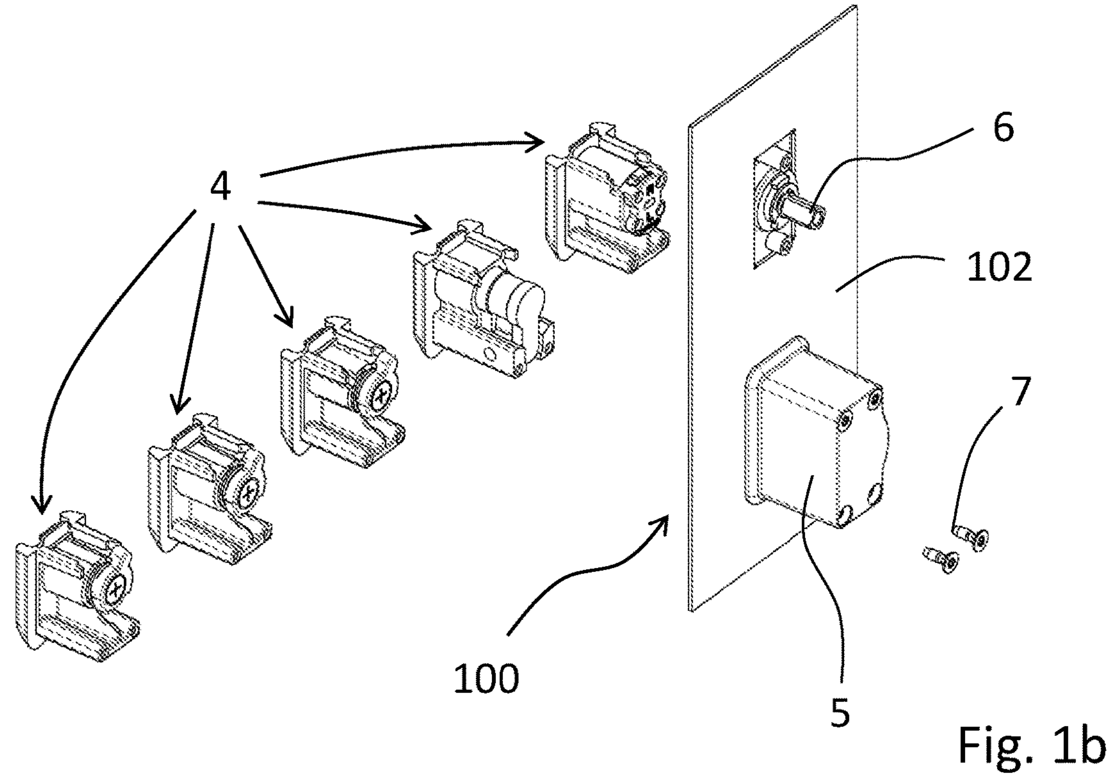

The illustrations of FIGS. 1*a* and 1*b* show a perspective side view of a modular locking system 10 with different release modules 4 which can be optionally inserted in the locking system 10.

The locking system 10 essentially comprises a dish 1 and an actuating lever 2, which can be pivoted in relation to the dish 1 and, in the illustration of FIG. 1*a*, is illustrated in a pivoted-out position. The locking system 10 is arranged on the front side 101 of a door 100, but extends part of the way through this door 100, as can be seen in the illustration of FIG. 1*b*. The door 100 has two rectangular openings, wherein part of the dish 1 and also an actuating spindle 6 extend through the upper opening, as can also be seen in the sectional view of FIG. 7*a*. As will be described in yet more detail in respect of the rest of the figures, the actuating spindle 6 is connected to a locking device 8, which is arranged on the other side 102 of the door 100. The lower opening of the door 100, which can be seen in FIG. 1*a*, serves to hold one of the plurality of release modules 4. Depending on which release module 4 is to be used for the purpose of unlocking the door 100, this release module can be inserted below the dish 1 and can then extend the dish 1 in the downward direction.

As can be seen in addition in FIGS. 1*a* and 1*b*, a cover 5 is additionally provided, this cover concealing the lower opening in the door 100 from the direction of the second side 102 of the door 100, and therefore the release module 4 can be inserted into the door from the front and then covered by the cover 5. Fastening means 7 designed in the form of screws are provided for the purpose of connecting the release module 4 to the cover 5. Once a release module 4 has been selected and inserted in the opening in the door 100, the corresponding release module 4 can be connected to the cover 5 in a disengageable manner via the fastening means 7. In order for the release module 4 to be changed over for another release module 4, it is then necessary, in reverse order, for the fastening means 7 first of all to be disengaged, for the actuating lever 2 to be pivoted out of the dish 1 and for the release module 4 then to be pulled out of the cover 5, or out of the lower opening in the door 100, in the forward direction.

Figure 2:
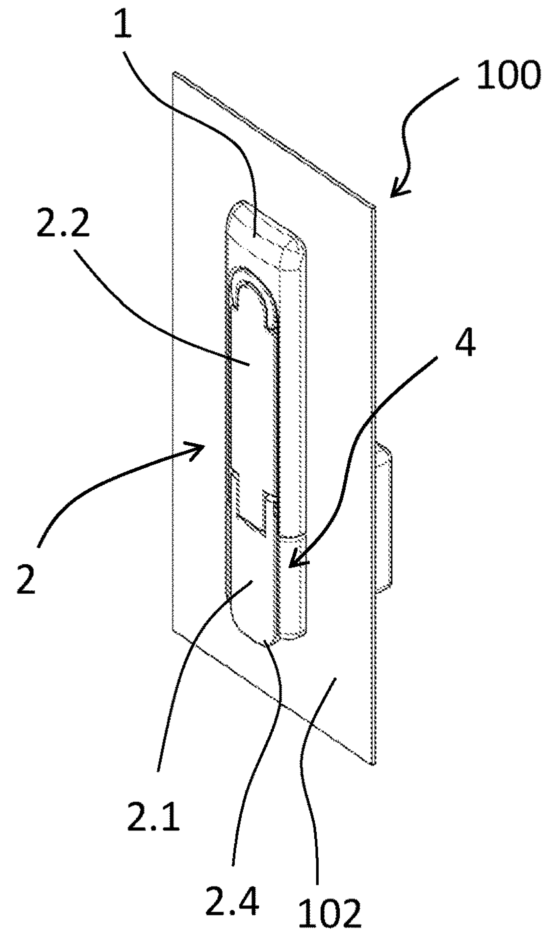
FIG. 2 shows a perspective front view of the locking system.

As can be seen in the illustration of FIG. 2, the actuating lever 2 is held in a pivoted-in position in the dish 1. For this purpose, the dish 1 has a dish holder 1.1, as can be seen, for example, in FIG. 4 or also in FIG. 1*a*. When the actuating lever 2, as shown in FIG. 2, is held in the dish 1 in a form-fitting manner, the actuating lever 2 cannot be moved and therefore the door 100 cannot be unlocked. In order for the actuating lever 2 to be pivoted about the actuating axis B according to the illustration in FIG. 1, it is necessary first of all for the actuating lever to be pivoted out of the holding contour 1.1 about the pivot axis S. This is because, as will be described in yet more detail hereinbelow with reference to FIGS. 7 and 8, the actuating lever 2, in the pivoted-in position, is arrested in the dish 1, or in the holding contour 1.1 of the dish 1, by a securing device 3. However, this arresting action can be disengaged again via the release module 4, in which case the actuating lever 2 can then be pivoted out of the dish 1 and pivoted about the actuating axis B for the purpose of actuating the locking device 8. The securing device 3 is connected to the dish 1 and is arranged essentially on the side 102 of the door 100. Although the securing device 3 is obscured from view by the cover 5 in FIGS. 1*b* and 6*a*, 6*b*, it can be seen in the sectional views of FIGS. 7 and 8.

Figure 3:
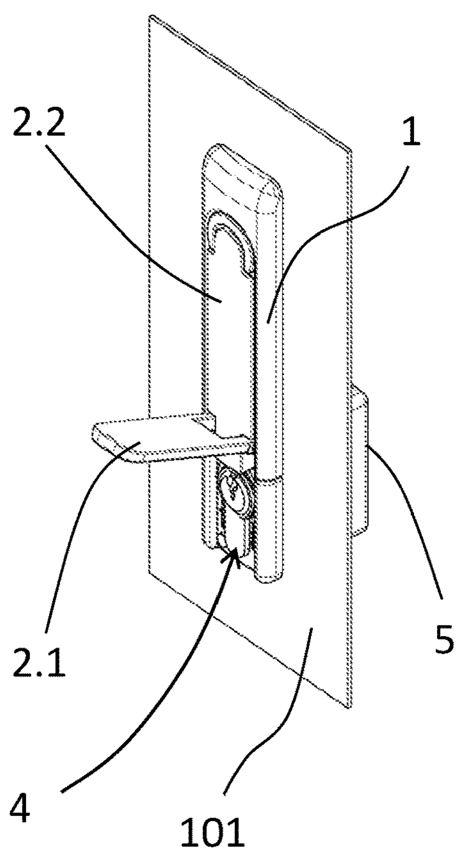
FIG. 3 shows a perspective view of the locking system according to FIG. 2 with a lock-cylinder cover pivoted up.

As can be seen with reference to the illustration of FIG. 3, the actuating lever 2 essentially comprises two elements, namely an actuating portion 2.2, which at one end is connected to the actuating spindle 6, and a lock-cylinder cover 2.1, which is connected to the actuating portion 2.2 in a pivotable manner. In the pivoted-in position, the lock-cylinder cover 2.1 covers over a locking cylinder 4.3 of the release module 4, and therefore, for unlocking purposes, it is necessary first of all for the lock-cylinder cover 2.1 to be swung up, as shown in the illustration of FIG. 3. When the lock-cylinder cover 2.1 has been swung up, the lock cylinder 4.3 is visible and can be rotated for example by means of a key, as is also known from normal house-door locks.

Figure 4:
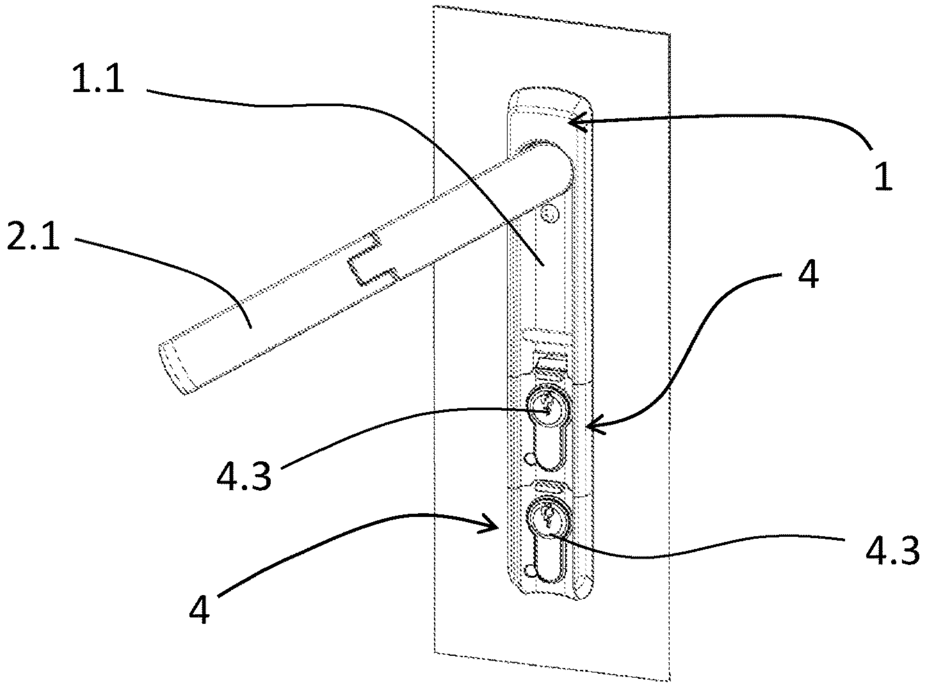
FIG. 4 shows a perspective view of a locking system with two release modules.

In the case of the design according to FIG. 4, two different release modules 4 are arranged below the dish 1. Although the two release modules 4 have a similar lock cylinder 4.3, a different key is nevertheless required in each case for unlocking purposes. This stems from the fact that the door 100 is to be opened by two different people, or by two different groups of people, but not everybody is to have the same key. The two release modules 4 are therefore interconnected with the securing device 3 such that all that is required is for just one of the two release modules 4, or the corresponding lock cylinder 4.3, to be rotated in order for it to be possible for the actuating lever 2 to be pivoted out of the dish 1.

As can also be seen in the illustration of FIG. 3, it is not just the dish 1 which has a holding contour 1.1; rather, the release module 4 also has a corresponding holding contour 4.2, which ensures that, in the pivoted-in position, the actuating lever 2 or the lock-cylinder cover 2.1 terminate flush not just with the dish 1, but also flush with the release module 4. Nevertheless, at one end, the actuating lever 2 however has a handling portion 2.4, which projects downward beyond the lowermost release module 4. This handling portion 2.4 therefore allows one hand to be used to grip behind the lock-cylinder cover 2.1 and then to swing the latter up in the forward direction, in which case the lock cylinder 4.3 is accessible.

The design of a release module 4 is now to be explained in more detail hereinbelow with reference to FIGS. 5*a* and 5*b*. A further design of the release module will also be described in yet more detail hereinbelow with reference to FIGS. 9*a* and 9*b*. The release module 4 illustrated in the illustrations of FIGS. 5*a* and 5*b* corresponds to the central release module 4 which is illustrated in FIGS. 1*a* and 1*b*. Although the further release modules 4 have possibly different lock cylinders 4.3—it can be seen, for example, in FIG. 1*a* that the two right-hand release modules 4 can be rotated via a tool rather than via a key—the basic construction of the release modules 4 is nevertheless identical. For this purpose, it is only the central release module 4 of FIGS. 1*a* and *b* which will be described in more detail hereinbelow, by way of example, with reference to FIGS. 5*a* and 5*b*.

As can be seen first of all, the release module 4 has, on its front side, two profiles 4.1 which project in relation to the holding contour 4.2. These profiles 4.1 ensure that the actuating lever 2 cannot be rotated about the actuating axis B; rather, it has to be pivoted first of all in the forward direction, about the pivot axis S, out of the holding contour 4.2 and also out of the holding contour 1.1 of the dish 1.

In order to retain the lock-cylinder cover 2.1 in the holding contour 4.2, the release module 4 has a retaining element 4.4, designed in the form of a permanent magnet, in the lower part of the holding contour 4.2. When the lock-cylinder cover 2.1 is located in the holding contour 4.2 of the release module 4, according to the illustration in FIG. 2, this retaining element 4.4 therefore ensures that the lock-cylinder cover 2.1 is not accidentally pivoted upward in relation to the actuating portion 2.2. In order for the lock cylinder 4.3 to be exposed, it is then necessary for the retaining force of the retaining element 4.4 to be overcome when the lock-cylinder cover 2.1 is being pivoted up.

As can also be seen, the lock cylinder 4.3, which can be rotated about the unlocking axis E via a key, is connected to a release finger 4.5, which is arranged so as to project radially in relation to the unlocking axis E. When the lock cylinder 4.3 rotates, the unlocking finger 4.5 also moves correspondingly and can then release the securing device 3. It is also the case that FIG. 5*b* illustrates two fastening holders 4.8, which are designed in the form of threaded bores, in which case the fastening means 7 can be screwed into the two fastening holders 4.8, through the cover 5, from the outside and can thus connect the release module 4 to the cover 5.

It can also be seen that the release module 4 has a bearing region 4.6, which extends over three sides of the release module 4. When the release module 4 is inserted into the opening in the door 100, for example according to the illustration in FIG. 1*a*, this bearing region 4.6, which is designed in the manner of a collar, bears on the outer side 101 of the door 100 and the rest of the release module 4 extends through the door 100. Three sides of the release module 4 therefore butt against the door 100.

As can further be seen in the illustration of FIG. 4, in the case of a plurality of release modules 4 arranged one below the other, these release modules can have somewhat different outer contours and therefore also different bearing regions 4.6. For example, only two sides of the upper release module 4 bear against the outer side 101 of the door 100, but, correspondingly, also a lower side of the lower release module 4, and therefore three sides of this release module, bear on the door 100. The upper release module 4 is designed in the form of an intermediate piece and the lower release module 4 is designed in the form of an endpiece.

Figure 6A:
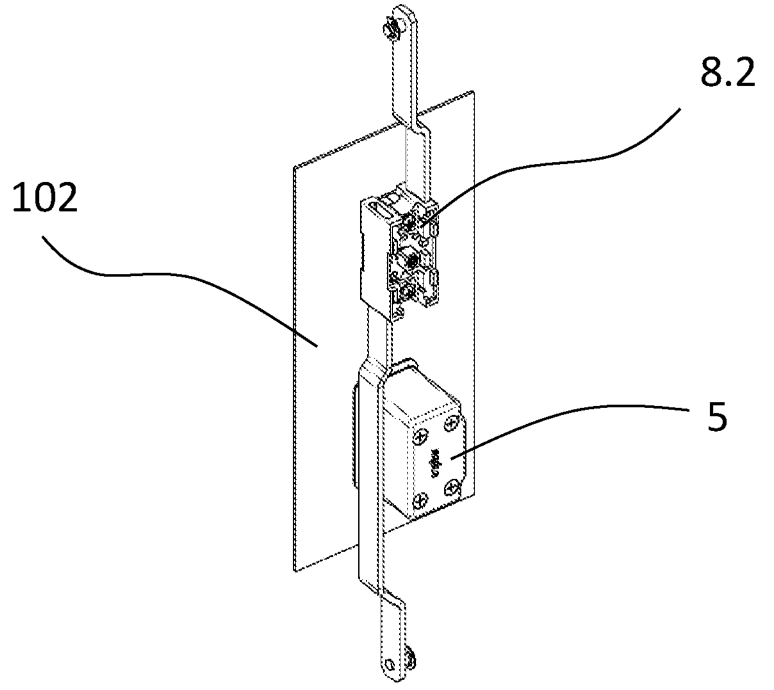
FIGS. 6*a* and 6*b* show perspective rear views of a locking system with different locking devices.
Figure 6B:
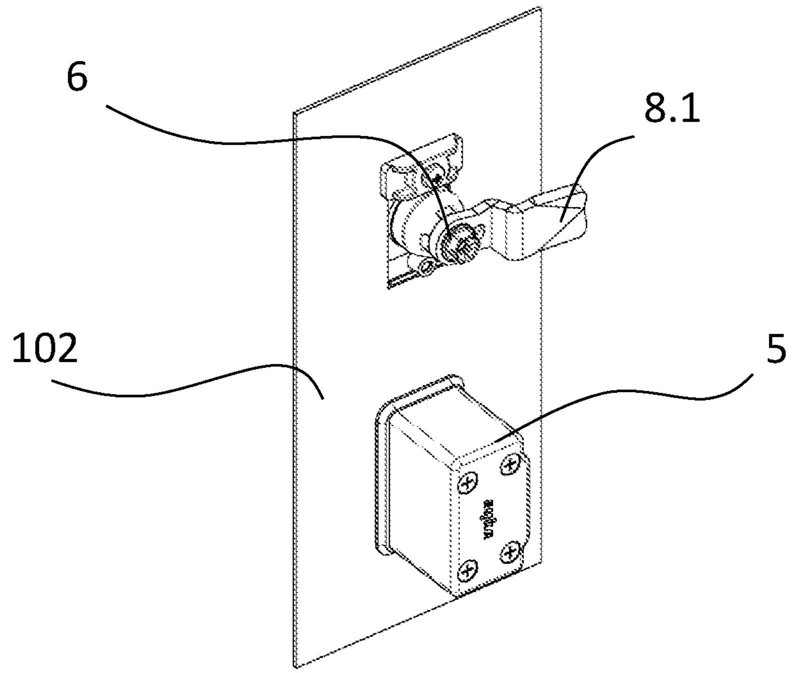

As can be seen with reference to FIGS. 6*a* and 6*b*, the actuating spindle 6 is connected to a locking device 8 on the inner side 102 of the door 100. In a locked position, the locking device 8 can secure the door 100 in relation to a door frame, in which case the door 100 cannot be opened. In an unlocking position, the locking device 8 can allow corresponding movement of the door 100, and therefore the latter can be opened. As can also be seen, the locking device 8 can be designed in different ways. In the illustration of FIG. 6*a*, it is designed, for example, in the form of a lock case 8.2 with two locking rods. In the design according to FIG. 6*b*, the locking device 8 is designed in the form of a casement lock 8.1, which is connected to the actuating lever 2 in a rotatable manner. To this extent, the modular locking system 10 provides for a modular changeover not just of the release modules 4, but also of the locking device 8, depending on the requirements which have to be met by the locking system 10.

The more precise internal design of the locking system 10 is now to be described hereinbelow with reference to FIGS. 7*a*, 7*b* and 8*a*, 8*b*.

Figure 7A:
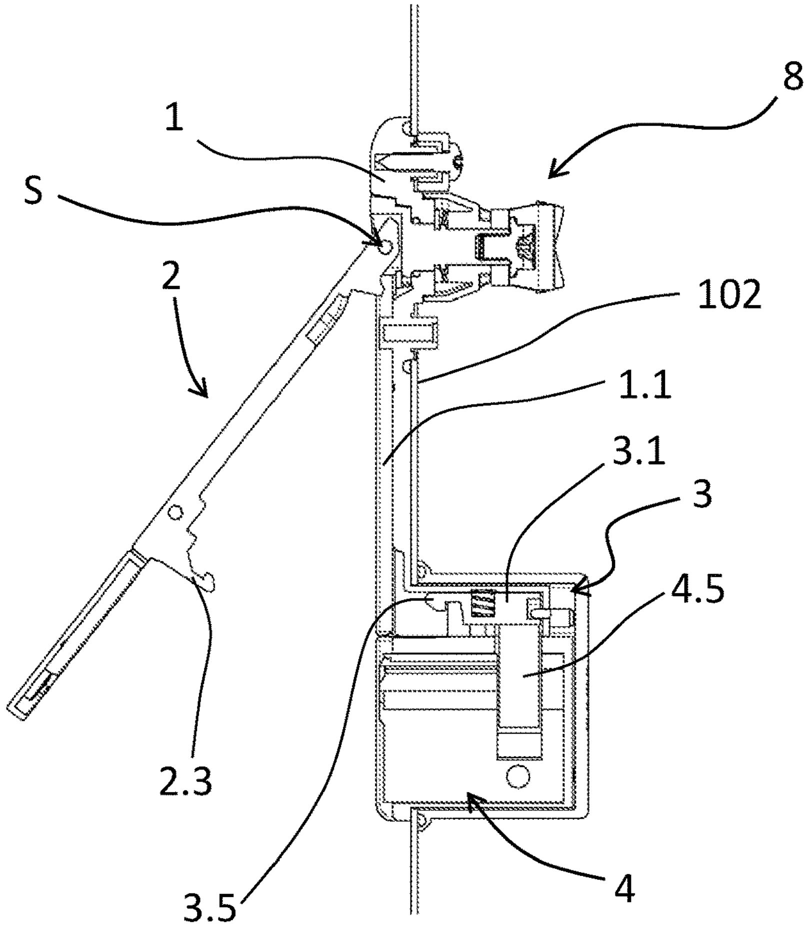
FIGS. 7*a* and 7*b* show sectional views of a locking system with a linearly movable securing catch.
Figure 7B:
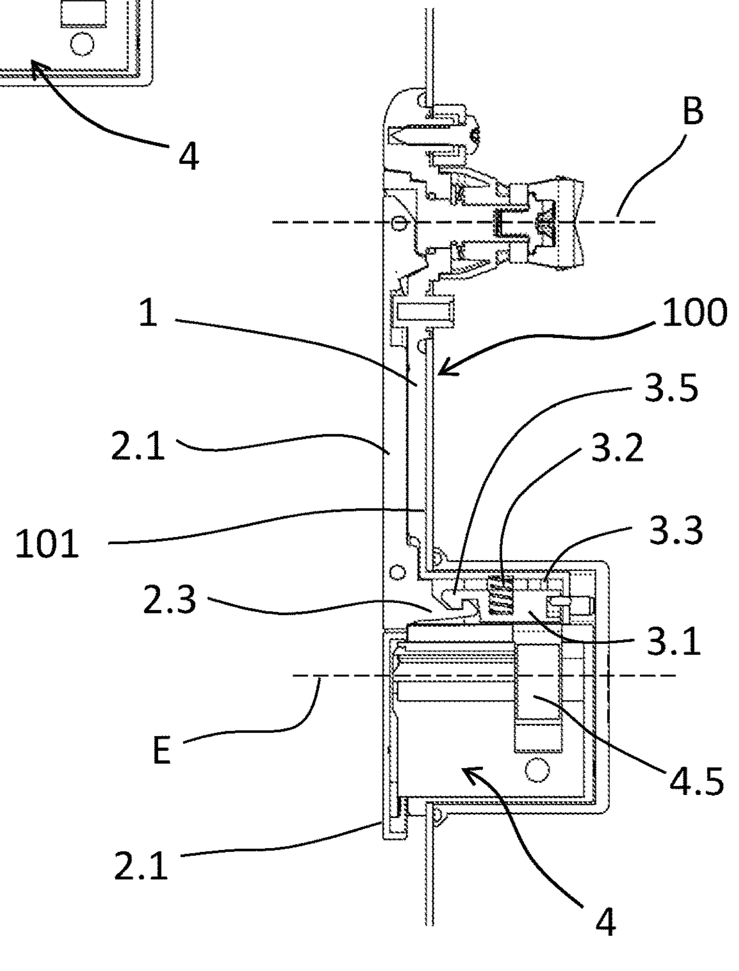

The illustration of FIG. 7*a* shows a lateral sectional view of the locking system 10. The actuating lever 2 here has been pivoted, about the pivot axis S, out of the holding contour 1.1 of the dish 1 and also out of the holding contour 4.2 of the release module 4 and, in this position, can be rotated about the actuating axis B in order to lock or to unlock the door. As can also be seen, the actuating lever 2, or the actuating portion 2.2, has a hook portion 2.3, which projects inward, that is to say in the direction of the dish 1. When the actuating lever 2 is pivoted about the pivot axis S and is pushed into the holding contour 1.1 of the dish 1, the hook portion 2.3 interacts with the securing device 3 such that the latter arrests the actuating lever 2 in the dish 1. This position is illustrated in FIG. 7*b*.

The securing device 3 has a securing catch 3.1, which has a hook-like end 3.5 at one end. In the pivoted-in position shown in FIG. 7*b*, this hook end 3.5 is in engagement with the hook portion 2.3 of the actuating lever 2, and therefore the actuating lever 2 can no longer be pivoted, about the pivot axis S, out of the dish 1. In order for the door 100 to be unlocked, the actuating lever 2 first of all has to be pivoted out of the dish 1 again and transferred into the position illustrated in FIG. 7*a*. For this purpose, the hook end 3.5 of the securing device 3 and also the hook portion 2.3 of the actuating lever 2 first of all have to be disengaged again.

The securing catch 3.1 is guided in a guide 3.3 and can therefore be moved linearly. The securing catch 3.1, and therefore also the hook end 3.5, is prestressed into the arresting position via a spring element 3.2, which is designed in the form of a compression spring. If the locking cylinder 4.3 of the release module 4 is then rotated about the unlocking axis E, the release finger 4.5 comes into contact with the securing catch 3.1 and moves the latter within the guide 3.3 counter to the spring force of the spring element 3.2. When the lock cylinder 4.3 has been rotated far enough, the securing catch 3.1 has been displaced to such an extent that the hook end 3.5 and the hook portion 2.3 are no longer in engagement and the actuating lever 2 can then be pivoted, about the pivot axis S, out of the dish 1. The different release modules 4 all have a similar release finger 4.5, which, when the lock cylinder 4.3 moves, moves the securing catch 3.1 such that the arresting action of the actuating lever 2 is disengaged. To this extent, there is no need for the securing device 3 to be altered or adapted when the release module 4 is changed over.

Figure 8A:
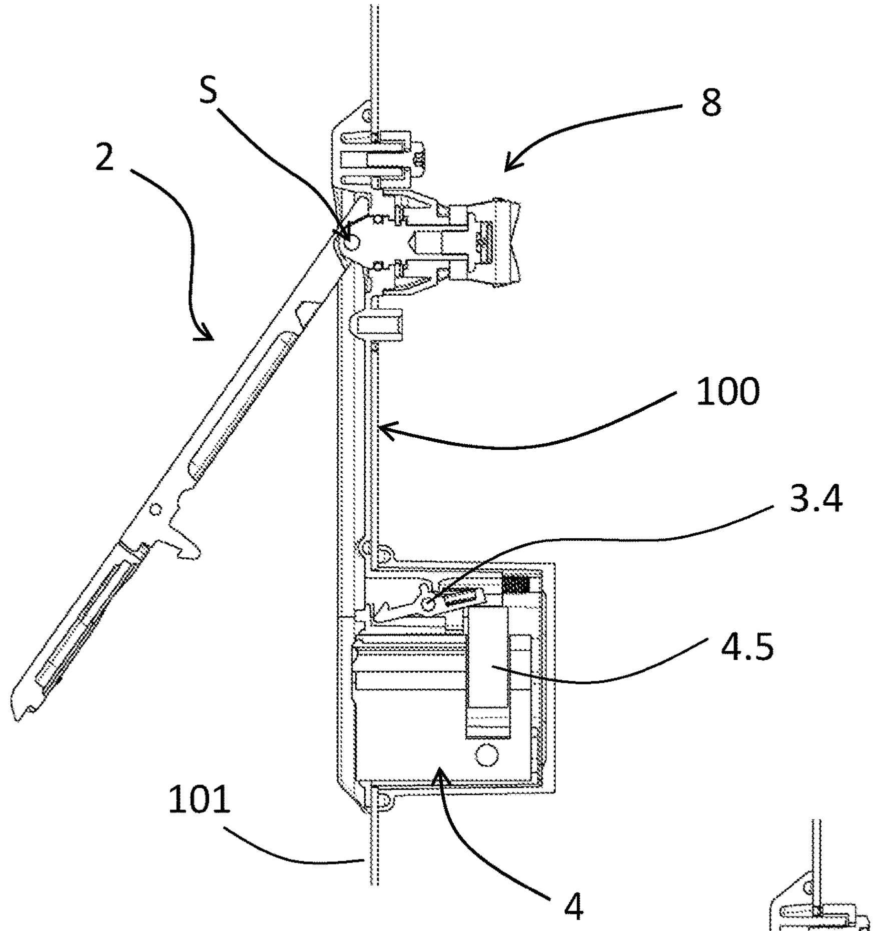
FIGS. 8*a* and 8*b* show sectional views of a locking system with a rotatable securing catch.
Figure 8B:
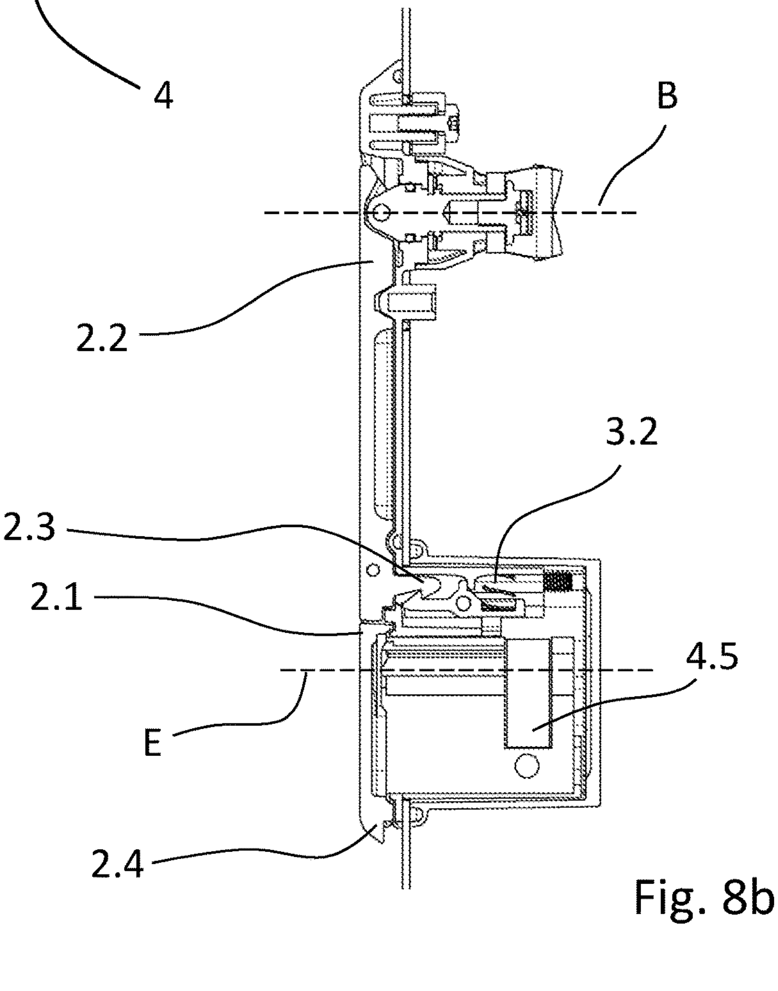

In the case of the exemplary embodiment which is shown in the illustration of FIGS. 8*a* and 8*b*, the locking system 10 functions basically in the same way as has already been described above in respect of FIGS. 7*a* and 7*b*. It is only the design of the securing device 3 which is different. This is because the securing device, rather than having a linearly movable securing catch 3.1, has a securing catch 3.1 which is mounted such that it can be pivoted about a point of rotation 3.4. In the locked position, which is illustrated in FIG. 8*b*, the hook end 3.5 of the securing catch 3.1 engages in the hook portion 2.3 of the actuating portion 2.2 from below and thus retains the actuating lever 2 in an arrested state on or in the holding contour 1.1 of the dish 1. It is also the case that the rotatable securing catch 3.1 is prestressed into the arresting position via a spring element 3.2, and therefore, when the lock cylinder 4.3 rotates, the securing catch is then pivoted about the point of rotation 3.4 by the unlocking finger 4.5, in which case the hook end 3.5 and the hook portion 2.3 disengage. Also clear to see in this sectional view is the downwardly projecting handling portion 2.4, which has to be swung up prior to the lock cylinder 4.3 being rotated, as has already been described above in respect of FIGS. 2 and 3.

In both designs, the actuating portion 2.2 has its lower end covering over an upper edge of the release module 4. Accordingly, the release module 4 can be pulled out of the cover 5 or of the door 100 only when, on the one hand, the fastening means 7 have been disengaged and, in addition, the actuating lever 2, or the actuating portion 2.2, has also been pivoted out of the dish 1. To this extent, it is not possible for the release module 4 to be removed without the lock cylinder 4.3 having been rotated into the release position by means of the appropriate key. Even if a person has, for example, access to the fastening means 7, it is necessary, for the purpose of removing the release module 4, for this person also to have the correct key.

Figure 5A:
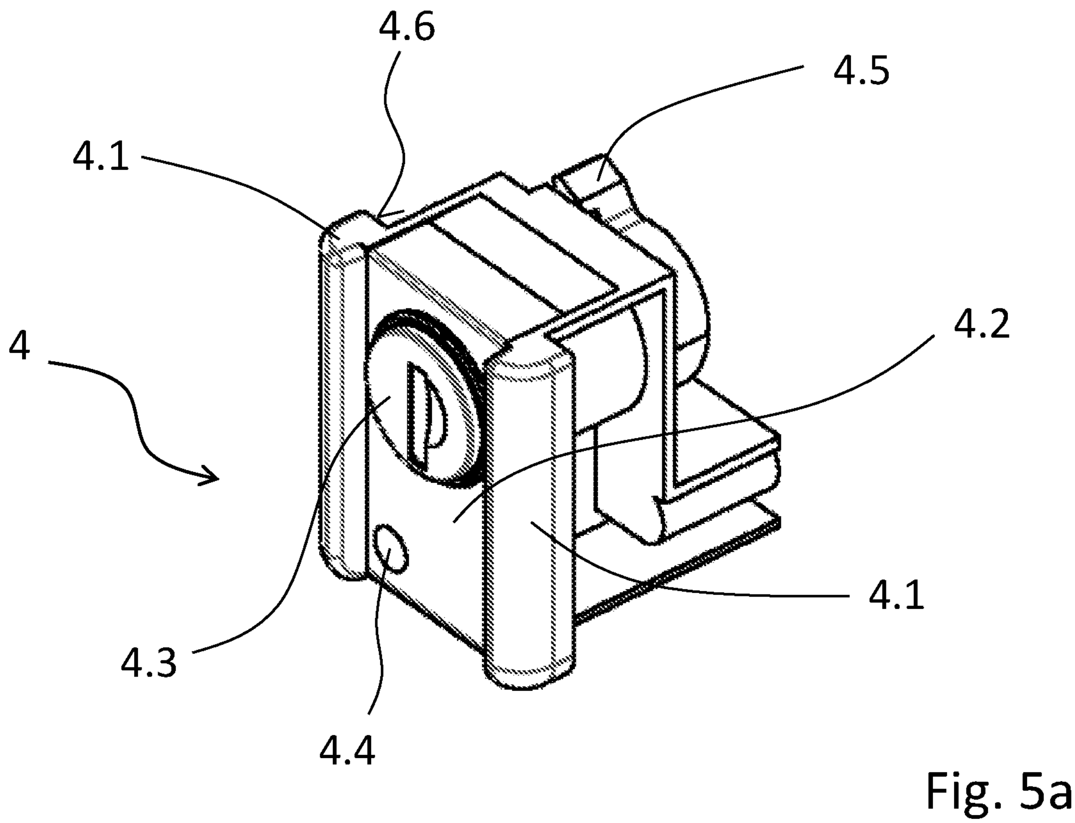
FIGS. 5*a* and 5*b* show perspective front and rear views of a release module.
Figure 5B:
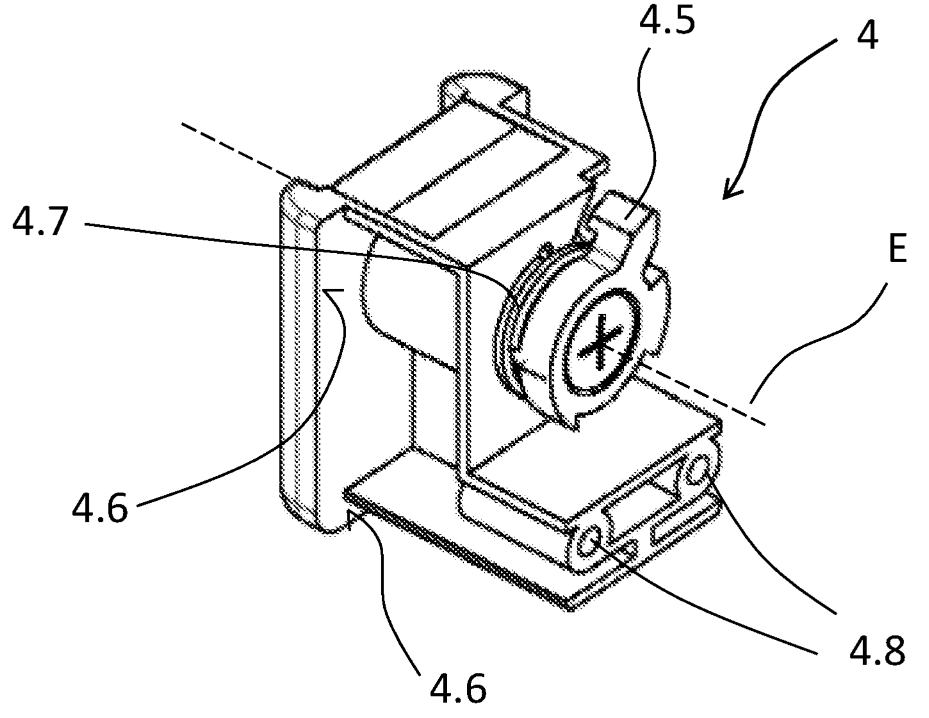
Figure 9A:
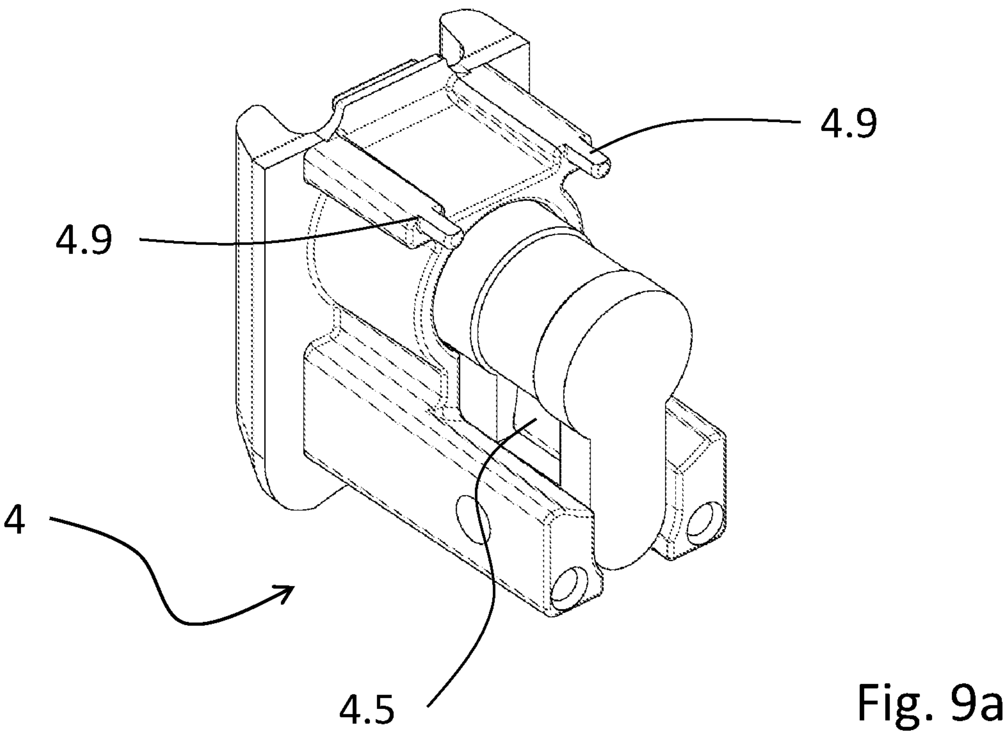
FIGS. 9*a* and 9*b* show perspective front and rear views of a further design of a release module.
Figure 9B:
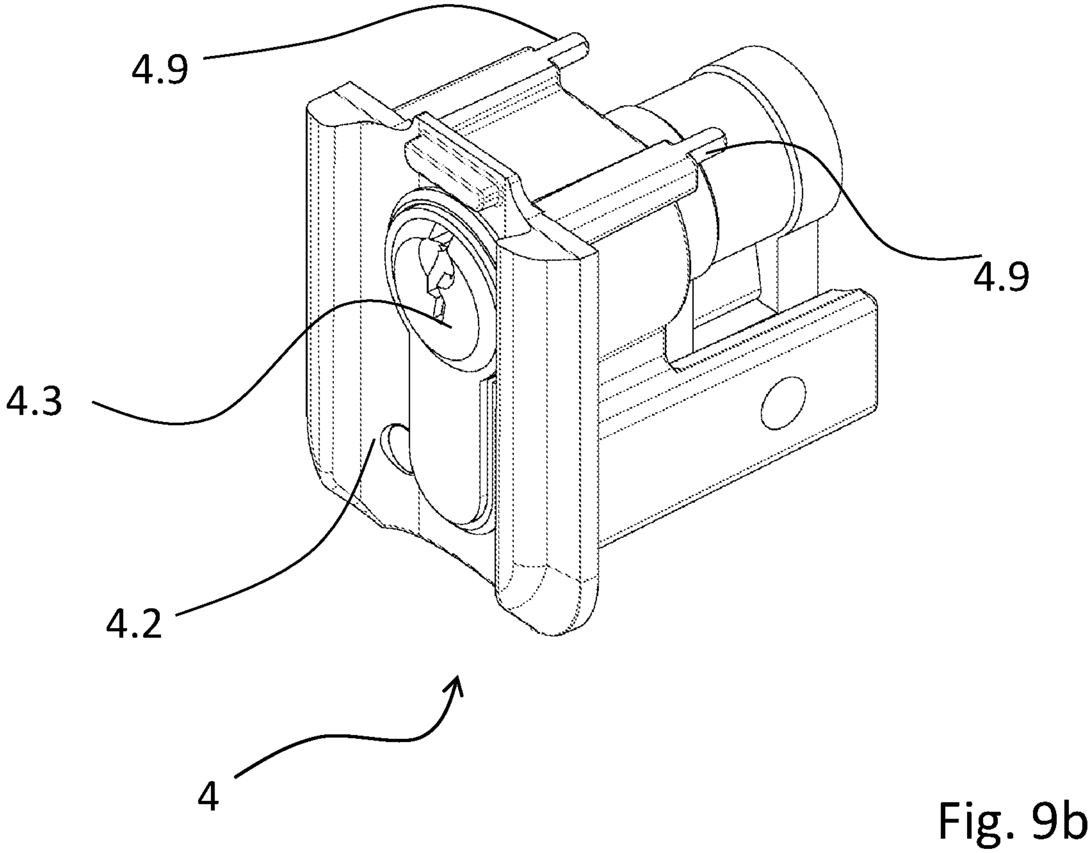

The release module 4 illustrated in FIGS. 9*a* and 9*b* essentially corresponds to the release module 4 which has already been described in respect of FIGS. 5*a* and 5*b* or also to those which are illustrated in FIGS. 1*a* and 1*b*. In addition, however, the release module 4 of FIGS. 9*a* and 9*b* has, at the upper end, two guide pins 4.9, via which the release module 4 can engage in the dish 1. The dish 1 has a corresponding holder, into which the guide pins 4.9 move as they are fitted into the dish. It is therefore also possible for the release modules 4 to be guided in the dish 1 via the guide pins 4.9.

Figure 10A:
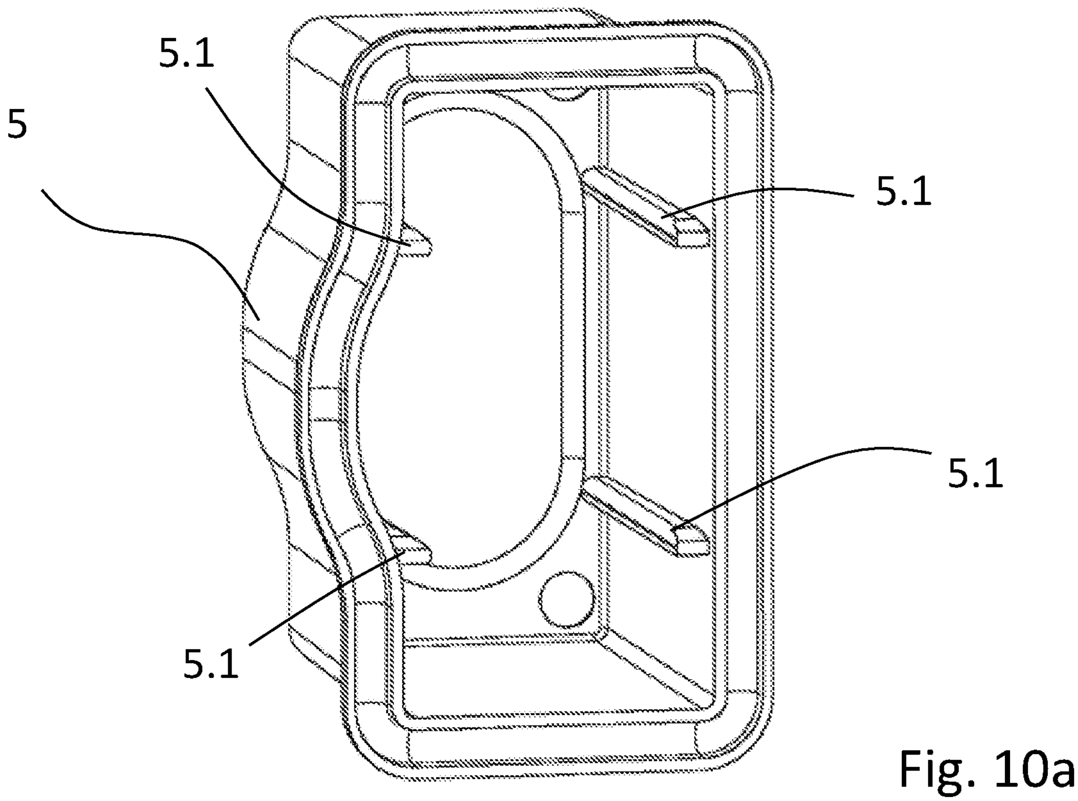
FIGS. 10*a* and 10*b* show perspective views of a cover.
Figure 10B:
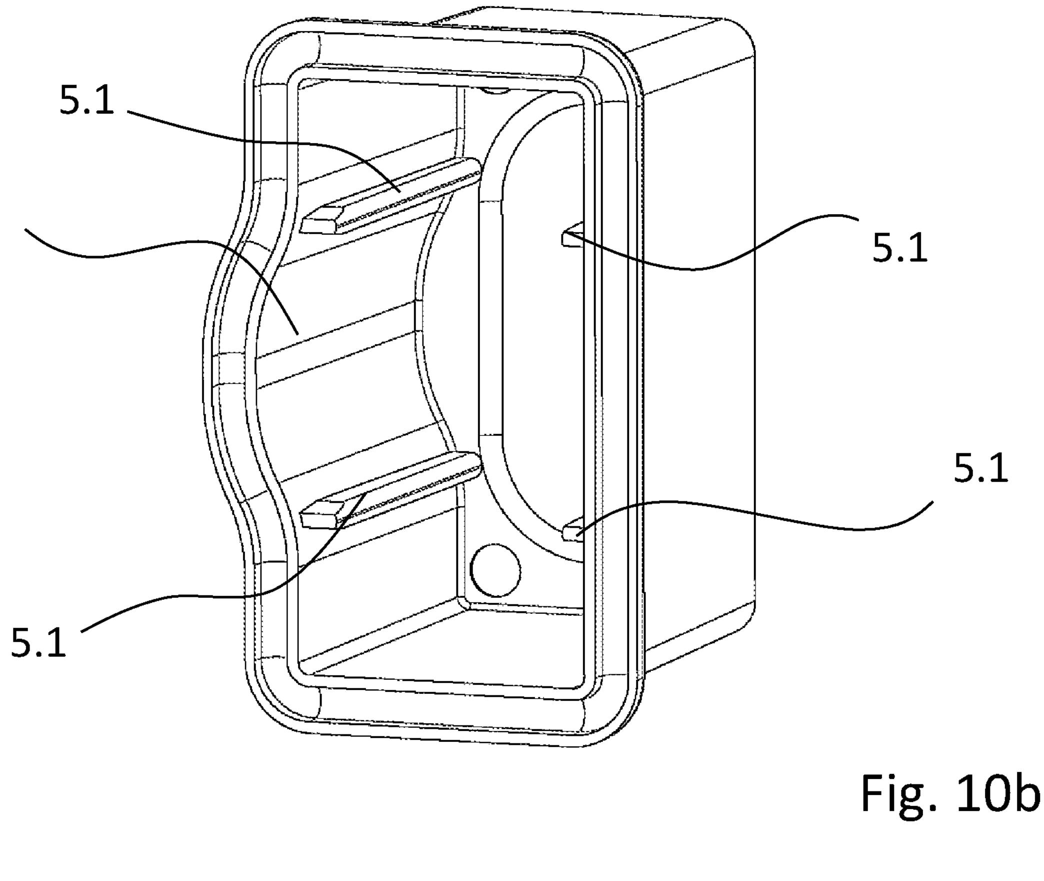

It is also the case that the cover 5 is shown in an enlarged view in the perspective illustration of FIGS. 10*a* and 10*b*. On their inner side, the side walls of the cover 5 have guiding crosspieces 5.1, on which the release modules 4 can be supported as they are pushed into the cover 5. As can be seen, four guiding crosspieces 5.1 are provided here, in each case two guiding crosspieces 5.1 being arranged on opposite sides of the cover 5.

LIST OF REFERENCE SIGNS

1 Dish
1.1 Holding contour
2 Actuating lever
2.1 Lock-cylinder cover
2.2 Actuating portion
2.3 Hook portion
2.4 Handling portion
3 Securing device
3.1 Securing catch
3.2 Spring element
3.3 Guide
3.4 Point of rotation
3.5 Hook end
4 Release module
4.1 Profile
4.2 Holding contour
4.3 Lock cylinder
4.4 Retaining element
4.5 Release finger
4.6 Bearing region
4.7 Spring element
4.8 Fastening holder
4.9 Guide pin
5 Cover
5.1 Guiding crosspiece
6 Actuating spindle
7 Fastening means
8 Locking device
8.1 Casement lock
8.2 Lock case
10 Modular locking system
100 Closing element/door
101 First side of the door
102 Second side of the door
B Actuating axis
E Unlocking axis
S Pivot axis

What is claimed is:

1. A modular locking system for a door, the system comprising:

a dish arranged on a first side of the door;

an actuating lever pivotable in relation to the dish that actuates a locking device for locking the door;

a securing device for arresting the actuating lever on the dish; and a release module that disengages the arresting action;

wherein the release module is an extension of the dish.

2. The system as claimed in claim 1, further comprising a plurality of the release modules that are inserted as an extension of the dish.

3. The system as claimed in claim 2, wherein a plurality of the release modules are used together, and wherein an arresting action of the actuator lever is disengaged by an individual one of the plurality of release modules.

4. The system as claimed in claim 2, wherein the dish and the release module each have a holding contour that holds the actuating lever, wherein the two holding contours of the dish and the release module are aligned with one another.

5. The system as claimed in claim 1, wherein the release module is arranged below the dish.

6. The system as claimed in claim 1, wherein the release module has a bearing region for bearing on the door.

7. The system as claimed in claim 1, wherein the actuating lever has an actuating portion and a lock-cylinder cover connected to the actuating portion in an articulated manner.

8. The system as claimed in claim 1, further comprising a cover that covers the release module, wherein the cover is releasably connected to the dish or to the securing device.

9. The system as claimed in claim 8, wherein the release module is guided in the cover.

10. The system as claimed in claim 1, wherein the securing device has a securing catch, which, for the purpose of arresting the actuating lever on the dish, engages the actuating lever.

11. The system as claimed in claim 10, wherein the securing catch is moveable.

12. The system as claimed in claim 1, wherein the actuating lever must be pivoted out of the dish before the release module can be removed.

13. The system as claimed in claim 1, wherein the release module has a release finger which can be transferred into a release position when a lock cylinder of the release module is rotated.

14. A method for installing a modular locking system for a door having a dish which can be arranged on a first side of the door, the system having an actuating lever which can be pivoted in relation to the dish for actuating a locking device which can be arranged on the other side of the door and is intended for locking the door, the system having a securing device for arresting the actuating lever on the dish and having a release module for disengaging the arresting action, the method comprising:

positioning the release module on the dish as an extension of the same.

15. A door having a modular locking system, the modular locking system comprising:

a dish mounted on a first side of the door;

an actuating lever that can be pivoted in relation to the dish for actuating the locking device to lock the door;

a securing device for arresting the actuating level on the dish; and a release module that disengages the arresting action, wherein the release module is an extension of the dish.

* * * * *